United States Patent

Bevins et al.

[11] Patent Number: 5,706,909
[45] Date of Patent: Jan. 13, 1998

[54] VEHICLE SAFETY AUTOMATIC BRAKING APPARATUS

[76] Inventors: Steven D. Bevins, 10417 Mills Tower Drive, Rancho Cordova, Calif. 95670; Marc W. Plante, 4813 Winter Oak Way, Antelope, Calif. 95843

[21] Appl. No.: 673,081

[22] Filed: Jul. 1, 1996

[51] Int. Cl.⁶ .................. B60R 25/04; B60R 25/08; B60R 25/10; B60T 7/12
[52] U.S. Cl. .................. 180/273; 180/287; 188/109; 188/162; 307/10.2; 340/426
[58] Field of Search .................. 180/273, 272, 180/271, 287; 188/109, 162; 303/19; 340/426, 667; 307/10.2, 10.3, 10.4

[56] References Cited

U.S. PATENT DOCUMENTS

| | | | |
|---|---|---|---|
| 1,187,372 | 6/1916 | Nilsen | 188/162 |
| 2,007,066 | 7/1935 | Witbeck | |
| 3,487,451 | 12/1969 | Fontaine | 303/19 |
| 3,866,723 | 2/1975 | Smith | |
| 3,937,295 | 2/1976 | Wright | 180/271 |
| 4,075,443 | 2/1978 | Fatur | |
| 4,116,296 | 9/1978 | Pleier et al. | 180/273 |
| 4,476,964 | 10/1984 | Broman | |
| 4,572,319 | 2/1986 | Fontaine | 180/273 |
| 4,608,825 | 9/1986 | Fontaine | 180/273 |
| 4,655,313 | 4/1987 | Hicks | |
| 4,664,218 | 5/1987 | Graham et al. | 180/272 |
| 4,969,541 | 11/1990 | Lin | 180/272 |
| 5,103,951 | 4/1992 | Inui et al. | |
| 5,120,980 | 6/1992 | Fontaine | 340/667 |
| 5,494,311 | 2/1996 | Blackburn et al. | |
| 5,574,424 | 11/1996 | Nguyen | 180/287 |

*Primary Examiner*—Peter C. English
*Attorney, Agent, or Firm*—John P. O'Banion

[57] ABSTRACT

A vehicle safety automatic braking apparatus having a driver seat weight sensor, a velocity sensor, an emergency brake actuator, and an engine kill switch which are interfaced with a controlling microprocessor. A microprocessor monitors the weight sensor and velocity sensor and, upon detection of the weight in the driver's seat falling outside a predetermined range and the speed of the vehicle being below a predetermined threshold, the emergency brake actuator and engine kill switch are activated to arrest motion of the vehicle.

18 Claims, 2 Drawing Sheets

VEHICLE SAFETY AUTOMATIC BRAKING APPARATUS

BACKGROUND OF THE INVENTION

1. Field of the Invention

The present invention pertains generally to devices and methods for automatically applying the brakes in a motor vehicle upon detection of a certain condition, and more particularly to an apparatus and method for automatically applying the vehicle brakes and killing the engine when the weight of the occupant in the driver's seat is outside a preset range and the vehicle is moving at a speed below a preset threshold.

2. Description of the Background Art

A serious hazard associated with unattended motor vehicles is vehicle movement due to failure of the vehicle operator to properly set the parking brake. And, even if the parking brake is set, an unauthorized person such as a child could place the vehicle in gear and step on the gas so as to cause the vehicle to overcome the force of the parking brake. Such inadvertent vehicle movement frequently results in damage to the vehicle or other property due to collision and, more seriously, can result in injury or death to bystanders.

Various automatic braking devices, systems and methods have been developed to address the problem of unwanted movement of unattended vehicles. These devices and methods typically apply the brakes when the vehicle operator has left the driver seat of the vehicle. Many such systems additionally employ a time delay so that temporary loss of weight in the driver seat due to travel over bumps or irregular terrain does not activate the braking system.

A problem which is nearly always experienced with such automatic braking devices is that, on occasion, it is desirable to move a vehicle without an operator in the driver seat, such as while towing or pushing the vehicle. The use of override or disconnect switches to turn off automatic braking systems are known, so that vehicles with automatic braking systems can be towed while the automatic braking system is disconnected. However, the location of the override or disconnect switch in the vehicle is not always known by the vehicle operator or person towing the vehicle, and thus there is generally delay and inconvenience experienced in disconnecting the automatic braking system to allow pushing or towing of the vehicle.

A serious deficiency in previously developed automatic braking devices is the failure to address the hazard presented by small children in unattended vehicles. Children frequently wish to "play" at vehicle operation, and will sit in the driver seat of a vehicle and attempt to operate the vehicle controls. If the child releases the parking brake during such play, the vehicle can roll and cause property damage to the vehicle, or injury or death to the child and bystanders could result. If the vehicle key is left in the ignition, a child may actually power the vehicle, greatly increasing the risk of injury and property damage. Conventional automatic braking systems cannot distinguish between an adult or a child in the driver seat and, therefore, are deactivated whenever there is weight in the driver's seat.

Accordingly, there is a need for a vehicle safety automatic braking apparatus which can distinguish between the presence of a child and an adult in the driver seat of a vehicle, which can activate the emergency brake and shut down the vehicle engine when a child inadvertently starts the vehicle or induces the vehicle to roll from a parked position, and which allows a vehicle to be towed or pushed without activating the brakes and without requiring the use of a disconnect switch. The present invention satisfies these needs, as well as others, and generally overcomes the deficiencies found in the background art.

SUMMARY OF THE INVENTION

The present invention pertains to a vehicle safety automatic braking apparatus which automatically activates the vehicle emergency brake, turns off the vehicle engine and activates the horn when the weight detected in the driver's seat of the vehicle falls outside of a preset range and the vehicle is moving at a speed that is below a preset threshold. In general terms, the invention comprises means for sensing weight on the driver's seat, means for sensing the speed of the vehicle, and means for activating the vehicle emergency brake and deactivating the vehicle engine responsive to vehicle velocity and weight in the driver seat. In addition, the invention can include means for sounding the vehicle's horn or setting off an alarm in response to activation of the emergency brake.

By way of example, and not of limitation, the weight sensing means comprises a mechanical or electric pressure or weight sensor located under the driver seat. The velocity sensing means preferably comprises a magnetic speed sensor or encoder associated with the vehicle transmission. The weight sensor and speed sensor are interfaced with a microprocessor or like programmable data processing means. The brake activating means preferably comprises an emergency brake actuator having a DC motor which drives a linear gear with a hook on the end. The hook pulls or pushes the emergency brake cable to activate the brake. The engine deactivating means preferably comprises a conventional engine kill switch which interrupts the supply of fuel to the vehicle engine and/or shuts off the electrical system. The emergency brake actuator and engine kill switch also are interfaced with the microprocessor.

The microprocessor includes programming which directs the emergency brake actuator to activate the brake and engine kill switch to turn off the vehicle engine upon detection, by the weight sensor and velocity sensor, of selected driver weight and velocity conditions. The programming preferably allows a user to modify the driver weight and vehicle velocity ranges or windows according to particular needs. The vehicle horn or a like sound-generating alarm also is preferably interfaced with the microprocessor, and is activated upon detection of the selected driver weight and velocity conditions.

In accordance with one aspect of the invention, the driver's weight is stored in the microprocessor along with a positive and negative deviation value. In addition, a speed threshold would be stored in the microprocessor. The vehicle would operate normally so long as the driver's weight falls within the stored window or the vehicle speed is above the speed threshold. If, however, the weight in the driver's seat falls outside of the window and the vehicle is moving at a speed below the speed threshold, the brakes would be automatically applied, the engine would be cut off and the horn or other alarm would sound.

In accordance with another aspect of the invention, the microprocessor could be programmed with a weight threshold instead of a window.

In accordance with another aspect of the invention, the microprocessor could be programmed with several weight values to accommodate multiple drivers. Prior to starting the vehicle, the driver would select his or her weight value by turning a special key and pressing a memory select button, or by entry from a keyboard or the like. The microprocessor could also be programmed to allow the car to be started for only a specified period of time after a weight value is selected.

In accordance with still another aspect of the invention, the vehicle operator could change his or her programmed weight value by sitting in the driver's seat, turning a special key, selecting a memory location if multiple memory locations are provided for multiple drivers, and turning the key off. In this instance, the microprocessor would store the seat weight that was sensed during this operation.

In accordance with another aspect of the invention, driver weights could be entered directly from a keyboard or other conventional data entry device.

In accordance with further aspects of the invention, the vehicle operator could program and modify the vehicle speed threshold using a keyboard or other conventional data entry device.

The invention is particularly well suited for preventing small children from operating a vehicle or causing it to roll. Because weight windows or thresholds for adult drivers would be stored in the microprocessor, the microprocessor can discriminate between adults and children in the driver seat. A child whose weight falls outside a selected weight window or is below a preset threshold is prevented from inadvertently starting or moving the vehicle during play.

Further, by storing a selectable zero pound weight parameter, the apparatus can temporarily be disabled so that the vehicle can be towed with the seat unoccupied. In addition, the invention protects against vehicle theft or car-jacking by a person whose weight deviates from the programmed value. For purposes of preventing car-jacking, the microprocessor could be programmed to delay activation of the brakes for a predetermined period of time that would allow the car-jacker to drive the vehicle until a safe distance away from the owner of the vehicle.

An object of the invention is to provide an apparatus that automatically activates the vehicle brakes when the weight of the person in the driver's seat is outside a stored weight range or below a stored weight threshold and the vehicle is moving at a speed below a stored speed threshold.

Another object of the invention is to provide an apparatus that automatically deactivates the vehicle engine when the weight of the person in the driver's seat is outside a stored weight range or below a stored weight threshold and the vehicle is moving at a speed below a stored speed threshold.

Another object of the invention is to provide an apparatus that automatically activates a horn or alarm when the weight of the person in the driver's seat is outside a stored weight range or below a stored weight threshold and the vehicle is moving at a speed below a stored speed threshold.

Another object of the invention is to provide a vehicle safety automatic braking apparatus which prevents property damage, injury and/or death which may occur due to inadvertent moving or rolling of unattended vehicles.

Another object of the invention is to provide a vehicle safety automatic braking apparatus which prevents children from operating motor vehicles.

Another object of the invention is to provide a vehicle safety automatic braking apparatus which allows vehicles to be towed without activation of the automatic braking system.

Another object of the invention is to provide a vehicle safety automatic braking apparatus which increases vehicle security and prevents theft and car-jacking.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
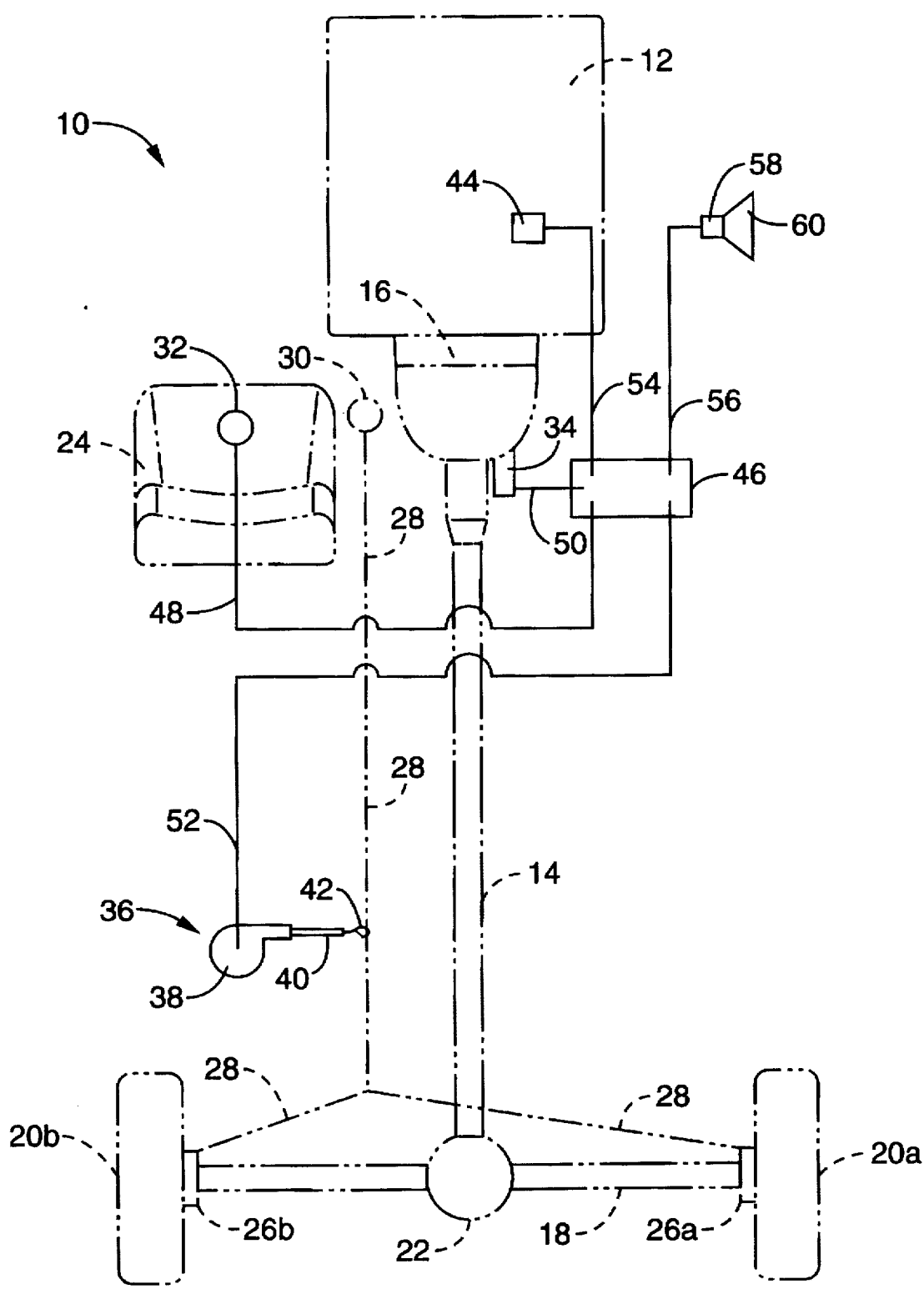
FIG. 1 is a functional block diagram of a vehicle safety automatic braking apparatus in accordance with the present invention.
Figure 2:
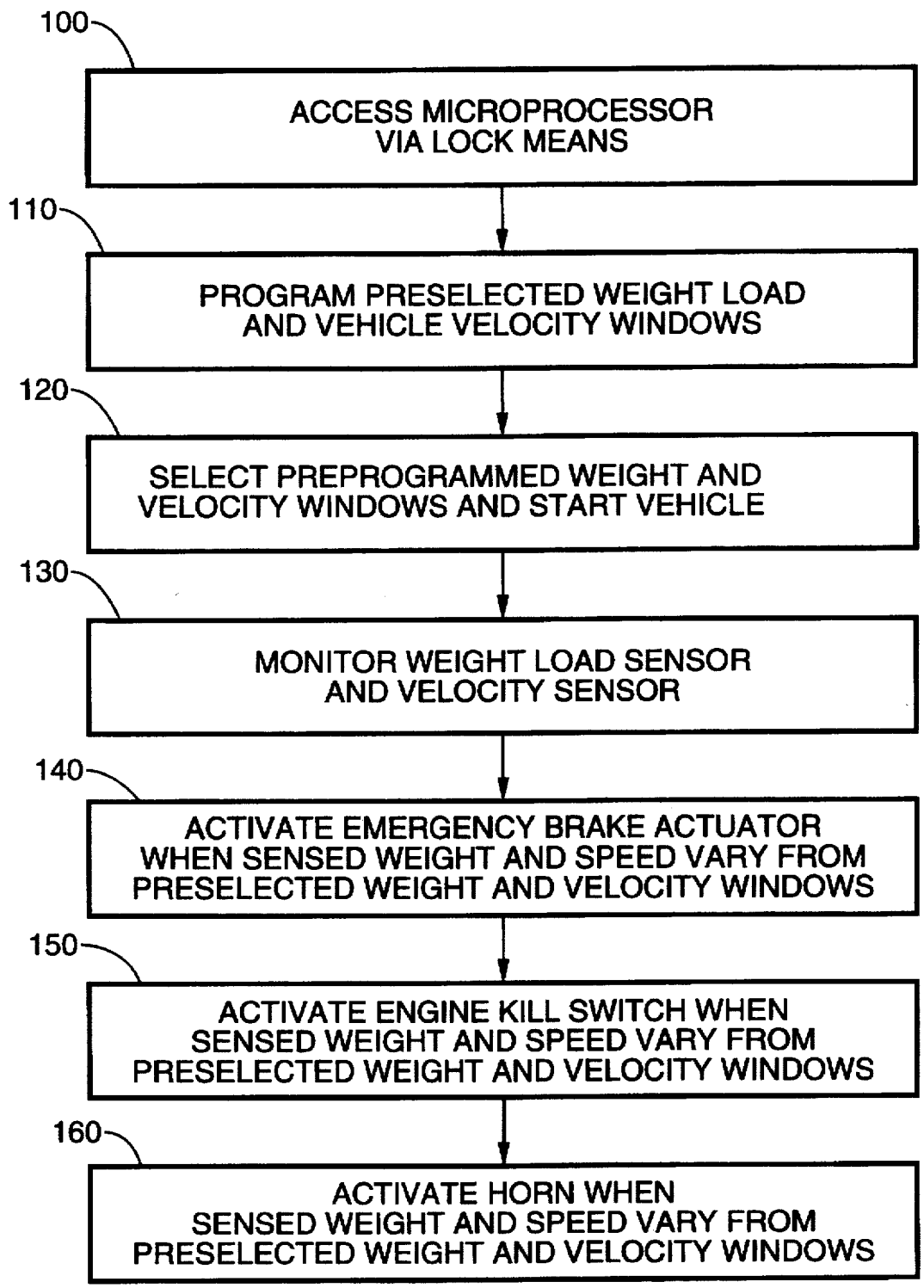
FIG. 2 is a flow chart showing generally the steps of using the present invention.

Referring more specifically to the drawings, for illustrative purposes the present invention is embodied in the apparatus generally shown in FIG. 1 and the method shown in FIG. 2. It will be appreciated that the apparatus may vary as to configuration and as to details of the parts, and that the method may vary as to details and order of the steps without departing from the basic concepts as disclosed herein.

Referring first to FIG. 1, a vehicle safety automatic braking apparatus 10 in accordance with the present invention is generally shown. The invention is described herein in terms of a conventional automotive vehicle having an engine 12, a drive shaft 14 mechanically interfaced with engine 12 via a transmission assembly 16, and a rear axle 18 and wheels 20a, 20b which are mechanically interfaced with drive shaft 14 by a differential gear assembly 22. The automotive vehicle also includes a driver seat 24, and emergency or parking brakes 26a, 26b which are operated via brake cable 28 and a conventional hand-operated brake control 30. The automotive vehicle may comprise a passenger car, van, bus, truck, tractor, farm vehicle, earth moving vehicle, or any like wheeled vehicle which utilizes an internal combustion engine or electric-powered engine.

The invention includes means for sensing or detecting the weight load on vehicle driver seat 24 due to the presence of a driver or vehicle operator. The weight load sensing means preferably comprises a conventional electrical weight sensor 32 or like weight or pressure sensing means but could alternatively be a mechanical sensing device. Weight sensor 32 is associated with driver seat 24 in a manner such that the weight of a vehicle driver or operator is transferred to weight sensor 32 when the vehicle driver or operator is seated in driver seat 24. Weight sensor 32 may be internal to driver seat 24 or external and positioned underneath driver seat 24.

Means for sensing the speed of a vehicle are also included with the invention, preferably comprising a conventional speed sensor 34 which can be found on most vehicles. Speed sensor 34 is typically associated with transmission assembly 16 and is positioned to detect the output rotational speed of transmission assembly 16 (and thus the rotational speed of wheels 20a, 20b). Speed sensor 34 is positioned to monitor and detect the rotational speed of wheels 20a, 20b both when engine 12 is running and not running. Speed sensor 34 is typically a conventional magnetic rotational encoder or variable reluctance magnetic pickup comprising a permanent magnet surrounded by a wire coil (not shown). A speed sensor ring (not shown) rotates according to the rotational motion of a rotating part of transmission assembly 16, and an alternating current is induced in the wire coil as teeth on the sensor ring pass by the magnetic pickup. Speed sensor 34 utilizes the alternating current thus generated to provide a square wave signal current having a frequency which is proportional to the rotational speed of wheels 20a, 20b. An electronic or optical rotational encoder or other type of velocity sensor may alternatively be used for the velocity sensing means of the invention.

Also provided with the invention are means for activating the vehicle emergency or parking brake, preferably in the form of an emergency brake actuator 36. Emergency brake actuator 36 includes a 12 volt DC motor 38 which drives or powers a linear gear 40. Linear gear 40 is mechanically interfaced to motor 38 by a gear reduction assembly (not shown). Motor 38 is connected to and receives power from a conventional vehicle battery (not shown). An eyelet or hook 42 on the end of linear gear 40 is positioned to engage and apply force to brake cable 28 when linear gear 40 is driven by motor 38. The emergency brake activating means of the invention is responsive to feedback from weight sensor 32 and speed sensor 34, as discussed further below.

The vehicle emergency brake activating means of the invention may alternatively comprise an pneumatic or hydraulic brake actuator (not shown) for use with hydraulic or pneumatic braking systems respectively, or any other vehicle emergency brake activating means required for vehicle braking systems past and presently known or which may be developed in the future. In the case of hydraulic and pneumatic braking systems, the brake activating means may comprise a fluid valve or air valve (not shown) respectively which is associated with a DC motor that activates the valve.

The invention also includes means for deactivating a vehicle engine, with the engine deactivating means preferably comprising a conventional engine kill switch 44. Engine kill switch 44 is preferably associated with the fuel injection or fuel supply system (not shown) for engine 12, and interrupts or cuts off the supply of fuel to the intake manifold (not shown) of engine 12, resulting in the immediate shut down of engine 12. Engine kill switch 44 may alternatively comprise an electrical switch which cuts electrical power from the vehicle battery (not shown) to engine 12 generally. The vehicle deactivating means is responsive to feedback from weight sensor 32 and speed sensor 34 as related below. The engine deactivating means may comprise a suitable electric disconnect or kill switch in the case of electric or battery powered vehicles, or may comprise any other type of engine kill or disconnect switch for any type of engine, past, or present, known or unknown, which may be used to power a vehicle.

A microprocessor 46 or like programmable data processing means is interfaced with driver seat weight sensor 32 by communication link 48, and is interfaced with velocity speed sensor 34 by communication link 50. Microprocessor 46 is also interfaced with emergency brake actuator 36 and engine kill switch 44 by communication links 52, 54 respectively. Communication links 48, 50, 52, and 54 comprise conventional interface cables which operatively couple microprocessor 46 to weight sensor 32, speed sensor 34, emergency brake actuator 36, and engine kill switch 44 respectively. Microprocessor 46 is also preferably interfaced via communication link 56 with the activation switch 58 for an automobile horn 60 or other sound generating alarm.

Microprocessor 46 serves as the brains or system controller for the apparatus 10. Under direction of microprocessor 46, emergency brake actuator 36, engine kill switch 44 and horn activation switch 58 act in response to input from weight sensor 32 and speed sensor 34 when detected weight loads and vehicle velocities meet certain parameters or conditions. Microprocessor 46 can include conventional user input/output means (not shown) such as a keyboard or keypad having a plurality of keys or buttons, and a liquid crystal or LED display, which are conveniently positioned relative to driver seat 24 for user access. The keypad is used for entering weight load and vehicle velocity speed values.

Microprocessor 46 is programmed to store one or more desired driver weight windows or thresholds, as well as one or more speed windows or thresholds for activation of emergency brake actuator 36 and engine kill switch 44. Microprocessor 46 is further programmed to activate emergency brake actuator 36 and engine kill switch 44 when the weight sensed in the driver seat 24 falls outside of a weight window or varies from a weight threshold and when the speed of the vehicle falls within a speed window or below a speed threshold.

For example, microprocessor 46 may be programmed to activate emergency brake actuator 36 and engine kill switch 44 upon detection of a weight in driver seat 24 that varies from a specific, single pre-selected weight load, such as "one hundred and fifty pounds." This weight condition provides a relatively narrow window. Alternatively, microprocessor 46 may be programmed to activate emergency brake actuator 36 and engine kill switch 44 upon detection of a weight load in driver seat 24 which exceeds or falls below a pre-selected weight load range or spread such as "one hundred and fifty pounds plus or minus ten pounds." In this case, a window or range of twenty pounds exists, and persons having a weight which differs from that of the user by more than ten pounds fall outside the window and are prevented from using the vehicle, thereby preventing theft or car-jacking of the vehicle by such persons. In yet another alternative, for example, microprocessor 46 may be programmed to activate emergency brake actuator 36 and engine kill switch 44 upon detection of weight load in driver seat 24 which falls below a preselected weight load value such as "one hundred and fifty pounds." This scenario would prevent children from using the vehicle, but would allow other adults weighing more than one hundred and fifty pounds to use the vehicle. Or, microprocessor 46 could be programmed to activate emergency brake actuator 36 and engine kill switch 44 when a weight load of greater than zero and less than one hundred and fifty pounds is detected in driver seat 24. In this case, the chosen weight window extends from just above zero pounds to one hundred and fifty pounds, and the apparatus 10 would prevent use of the vehicle by a person (such as a child) weighing less than the set one hundred and fifty pound weight, but would also allow the vehicle to be towed without activation of emergency brake actuator 36 and engine kill switch 44 when no one is present in driver seat 24.

Preferably, a weight window or condition such as "plus or minus ten pounds" is preprogrammed into microprocessor 46, and is left unchanged during regular vehicle use. Thus, when the driver of the vehicle uses the invention, he or she need only enter his or her weight into microprocessor 46, and microprocessor 46 uses the pre-programmed "plus or minus ten pound" window in conjunction with the entered driver weight to define a weight load window of one hundred and fifty pounds plus or minus ten pounds. Microprocessor 46 would then activate brake actuator 36 and engine kill switch 44 upon detection in driver seat 24 by weight sensor 32 of weights which fall outside the range or window of one hundred and fifty plus or minus ten pounds, as described above.

Since weights vary from person to person, factory programmed driver weights is not practical. Therefore, programming of microprocessor 46 with weight load and velocity windows is preferably carried out via a keyboard or other conventional input means associated with microprocessor 46. Alternatively, weight values could be programmed into microprocessor 46 directly from weight sensor 32 via communication link 48. For example, when the user sits in the driver seat 24 prior to starting the vehicle, the weight could be transferred to microprocessor 46 via link 48. Furthermore, the entered driver weight and pre-programmed weight window can be displayed so that the user may verify the entered weight load window.

Preferably, storage of weight information into microprocessor 46 is restricted by lock means (not shown) such as a key which is separate from the vehicle ignition key. Alternatively, the entry of a numeric code on a keypad may be required prior to entering or changing the weight load or weight window. In yet another alternative, the lock means may comprise an ID scanner for a magnetic strip card. The user would access the microprocessor by the lock means and then enter the driver weight into microprocessor 46 via keypad by pushing keys or buttons in a conventional manner, or by allowing entry of the user weight directly from the weight sensor 32 as described above.

Microprocessor 46 also preferably allows a user to pre-program a vehicle speed window or speed range. Preferably, the speed range or window for which brake actuator 36 and engine kill switch 44 are activated is set for a speed of greater than zero miles per hour but less than five to seven miles per hour, with microprocessor 46 programmed to arrest vehicle motion when sensed speed falls within this window (e.g., below the upper threshold) and when the sensed weight falls outside its respective window. This speed range allows the apparatus 10 to arrest vehicle motion due to rolling of a vehicle, but prevents actuation of the vehicle brakes 26a, 26b during regular vehicle use at higher speeds due to malfunction of a component during travel on rough surfaces. The activation of emergency brake actuator 36 and engine kill switch 44 at higher speeds during regular vehicle use is undesirable since the vehicle may be damaged and loss of vehicle control may occur.

Microprocessor 46 also includes programming for direction and control of the automatic braking apparatus 10 according to feedback from weight sensor 32 and velocity speed sensor 34. Preferably, the programming associated with microprocessor 46 carries out the operations of:

(i) allowing entry and storage of one or more pre-selected driver weight load values, and activation windows or thresholds for weight sensor 32;

(ii) allowing entry and storage of one or more pre-selected activation windows or thresholds for speed sensor 34;

(iii) allowing the user to select one of the pre-programmed driver weight load values;

(iv) allowing the vehicle to be started for a predetermined time period after the driver selects his or her stored weight value;

(v) monitoring input or feedback from weight sensor 32 and speed sensor 34;

(vi) activating emergency brake actuator 36 as a function of weight sensed by weight sensor 32 and speed sensed by speed sensor 34;

(vii) activating engine kill switch 44 as a function of weight sensed by weight sensor 32 and speed sensed by speed sensor 34; and (viii) activating vehicle horn 60 as a function of weight sensed by weight sensor 32 and speed sensed by speed sensor 34.

The vehicle safety automatic braking apparatus 10 may additionally include an override switch (not shown) to deactivate the apparatus when desired. Additionally, microprocessor 46 may include programming for time delay so that brief fluctuations in weight detected in driver seat 24 due to travel over bumps does not cause activation of emergency brake actuator 36 and engine kill switch 44.

When in use, the invention will prevent children from causing movement of an automotive vehicle during play. If a child having a weight which falls below a pre-selected weight load value or range is sitting in driver seat 24 and releases emergency brake control 30 and causes the vehicle to roll, or starts the vehicle engine and causes the car to move under power, microprocessor 46 activates emergency brake actuator 36 and engine kill switch 44 to arrest vehicle motion. As discussed above, the weight load range or window selected and entered into microprocessor 46 may be varied as required, and may be set to prevent activation of emergency brake actuator 36 and engine kill switch 44 when no one is present in driver seat 24 to allow towing of the vehicle when no one is present in driver seat 24. The invention additionally provides security against theft and car-jacking, since the user can program microprocessor to 46 activate emergency brake actuator 36 and engine kill switch 44 for weight loads detected in driver seat 24 which differ even slightly from the weight of the user, thereby preventing adults of different weight from using the vehicle.

Programming microprocessor 46 to activate emergency brake actuator 36 and engine kill switch 44 only when the detected velocity is in the range of from zero to five to seven miles per hour prevents damage to the vehicle and loss of control of the vehicle which may occur if emergency brake actuator 36 and engine kill switch 44 are activated at higher speeds under regular vehicle operation. However, the user may choose to program other vehicle velocity parameters or windows into microprocessor 46 if desired.

The steps of the operation of the vehicle safety automatic braking apparatus comprising the invention will be more fully understood by reference to the flow diagram shown generally in FIG. 2, as well as the schematic representation of the apparatus 10 shown in FIG. 1.

At step 100, the user accesses microprocessor 46 by activating lock means for controlling access to microprocessor 46. As related above, the lock means preferably comprises a key (other than the ignition key) which opens a lock associated with microprocessor 46, or an alphanumeric code sequence which is entered on a keypad associated with microprocessor 46. The user gains access to microprocessor 46 by mining a special key or by entering the code on the keypad, in the manner described above.

At step 110, the user stores his or her weight in microprocessor 46. Optionally, the user can program or modify one or more weight load windows or thresholds in microprocessor 46 by user input means such as the keypad described above, or directly from weight sensor 32 as described above. If, for example, the user weighs one hundred and fifty pounds, he or she may wish to enter a weight range or window of one hundred and fifty pounds plus or minus ten pounds, and program microprocessor to activate emergency brake actuator 36 and engine kill switch 44 when weight loads outside of this range are detected. Note also that different weight load windows, values or parameters may be entered and stored for different users.

At step 110, the user may also enter a velocity window, range or value into the microprocessor 46. As related above, the preferred velocity window for use with the invention will result in arresting the motion of a vehicle when sensed velocity falls within the range of greater than zero miles per hour but less than five to seven miles per hour. Once this velocity window has been entered into microprocessor 46, it preferably is not changed, although the user may subsequently wish to change the entered weight load window.

At step 120, the user selects his or her stored weight parameters, and then starts the vehicle. Microprocessor 46 is preferably programmed to provide a time delay of ten seconds, for example, after selecting a stored weight value during which the user could start the vehicle engine in a normal fashion. Also, as stated above in step 110, several weight parameters or windows may be entered into microprocessor 46 for various potential users of the vehicle, and the present user, at step 120, selects the desired window prior to starting the vehicle. The use of the invention may also select a stored velocity parameter or window in step 120. However, as described above, a velocity window or parameter of between zero and five to seven miles per hour is preferably used continuously, with microprocessor being 46 programmed to arrest vehicle motion when sensed speed falls within this window and sensed weight falls outside the weight load window.

Preferably, microprocessor 46 is pre-programmed in step 110 to store the weights of all of the individual drivers who use the vehicle, and one preferred weight load condition such as "plus or minus ten pounds." Thus, in step 120, the driver needs only to select and enter his or her weight into microprocessor 46, either directly through weight sensor 32 or via the keypad. Microprocessor 46 would then use the selected driver weight value with the pre-programmed "plus or minus ten pounds" condition to define a weight load window equal to the entered driver weight plus or minus ten pounds. Thus, the driver would not have to specify a weight load window each time the vehicle was used, but would only be required in step 120 to select and enter his or her weight.

At step 130, microprocessor 46 monitors weight sensor 32 and speed sensor 34 via communication interfaces 48, 50 respectively. This step is carried out both when vehicle engine 12 is running, and when engine 12 is off and the vehicle is parked.

At step 140, microprocessor 46 activates emergency brake actuator 36 in response to detection by weight sensor 32 of a weight that varies from or falls outside the pre-programmed, pre-selected weight window, value, range, condition, or parameter and upon detection by speed sensor 34 of a speed or velocity that falls within the pre-selected vehicle velocity window, value, range, condition, or parameter.

At step 150, microprocessor 46 activates engine kill switch 44 in response to detection by weight sensor 32 of a weight that varies from or falls outside the pre-programmed, pre-selected weight window, value, range, condition, or parameter and upon detection by speed sensor 34 of a speed or velocity that falls within the pre-selected vehicle velocity window, value, range, condition, or parameter. Step 150 is generally carried out simultaneously with step 140.

At step 160, microprocessor 46 activates horn activation switch 58 and horn 60 in response to detection by weight sensor 32 of a weight that varies from or falls outside the preprogrammed, pre-selected weight window, value, range, condition, or parameter and upon detection by speed sensor 34 of a speed or velocity that falls within the pre-selected vehicle velocity window, value, range, condition, or parameter. Step 160 is generally carried out simultaneously with steps 140 and 150.

Those skilled in the art will appreciate that microprocessor 46 is a conventional programmed data processing device which can include internal or external memory, input/output interfaces, and peripheral devices to implement the apparatus described herein. It will also be appreciated that the weight and velocity windows, thresholds and other parameters described above, as well as their inter-relationship and use for activating the vehicle brakes, engine kill switch and horn or alarm, can easily be programmed into microprocessor 46 using conventional programming techniques based on the methods and operational characteristics of the apparatus which have been described.

Accordingly, it will be seen that this invention provides a vehicle safety automatic braking apparatus which automatically activates the vehicle emergency brake, rams off the vehicle engine and activates the horn when the weight detected in the driver seat of the vehicle does not match or correspond to a predetermined amount and the vehicle velocity is below a predetermined speed. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An automatic braking apparatus for a vehicle having a driver seat, a brake and an engine, comprising:
   (a) weight sensing means for sensing weight load on said driver seat;
   (b) speed sensing means for sensing speed of said vehicle;
   (c) braking means for activating said brake;
   (d) control processor means operatively coupled to said weight sensing means, said speed sensing means, and said braking means for activating said braking means when said weight load on said driver seat is outside a preset weight load range concurrently with said vehicle moving at a speed below a preset speed threshold.

2. An apparatus as recited in claim 1, further comprising means for deactivating said engine concurrently with activating said braking means.

3. An apparatus as recited in claim 1, further comprising means for activating an automobile horn concurrently with activating said braking means.

4. An apparatus as recited in claim 1, wherein said control processor means includes means for entry, storage and selection of a plurality of weight load ranges.

5. An apparatus as recited in claim 1, wherein said speed sensing means comprises a magnetic encoder, said magnetic encoder associated with a vehicle transmission.

6. An apparatus as recited in claim 1, wherein said braking means comprises an emergency brake actuator, said emergency brake actuator comprising:
   (a) a DC motor;
   (b) a linear gear, said linear gear mechanically interfaced with said DC motor; and
   (c) means, included on an end of said linear gear, for engaging a vehicle emergency brake cable.

7. An apparatus as recited in claim 1, further comprising lock means for controlling access to said control processor means.

8. A vehicle safety automatic braking apparatus, comprising:
   (a) a driver seat weight sensor;
   (b) a vehicle speed sensor;
   (c) braking means for activating a vehicle emergency brake;

(d) engine deactivating means for deactivating a vehicle engine; and (e) a microprocessor, said microprocessor including program means for receiving a weight load sensed by said weight sensor, for receiving a vehicle speed sensed by said vehicle speed sensor, and for activating both said bring means and said engine deactivating means when said weight load is outside a stored weight load window concurrently with the vehicle speed being below a stored vehicle speed threshold.

9. An apparatus as recited in claim 8, further comprising:

(a) means for activating a vehicle horn;

(b) said microprocessor including program means for activating said vehicle horn activating means when said sensed weight load is outside said stored weight load window concurrently with the vehicle speed being below the stored vehicle speed threshold.

10. An apparatus as recited in claim 8 wherein said vehicle speed sensor comprises a magnetic encoder, said magnetic encoder associated with a vehicle transmission.

11. An apparatus as recited in claim 8, wherein said braking means comprises an emergency brake actuator, said emergency brake actuator comprising:

(a) a DC motor;

(b) a linear gear, said linear gear mechanically interfaced with said DC motor; and (c) means, included on an end of said linear gear, for engaging a vehicle emergency brake cable.

12. An apparatus as recited in claim 8, further comprising lock means for controlling access to said microprocessor.

13. A vehicle safety automatic braking apparatus, comprising:

(a) a driver weight sensor, said weight sensor associated with a vehicle driver seat;

(b) a vehicle velocity sensor;

(c) an emergency brake actuator;

(d) an engine kill switch;

(e) a vehicle horn activation switch; and (f) a microprocessor, said microprocessor interfaced with said driver weight sensor, said vehicle velocity sensor, said emergency brake actuator, said engine kill switch, and said vehicle horn activation switch, said microprocessor including program means for simultaneously activating said brake actuator, said engine kill switch and said horn activation switch when the weight sensed by said driver weight sensor is outside a stored weight load window concurrently with the speed of the vehicle sensed by said velocity sensor being below a stored vehicle speed threshold.

14. An apparatus as recited in claim 13, wherein said microprocessor includes programming means for carrying out the operations of:

(a) allowing entry and storage of at least one weight range for said driver weight sensor;

(b) allowing entry and storage of at least one speed threshold for said vehicle velocity sensor;

(c) allowing entry and storage of at least one driver weight value; and (d) monitoring input from said driver weight sensor and said vehicle velocity sensor.

15. An apparatus as recited in claim 13, wherein said emergency brake actuator comprises:

(a) a DC motor;

(b) a linear gear, said linear gear mechanically interfaced with said DC motor; and (c) means, included on an end of said linear gear, for engaging a vehicle emergency brake cable.

16. An apparatus as recited in claim 13, further comprising lock means for controlling access to said microprocessor.

17. A method for arresting movement of a vehicle, comprising the steps of:

(a) providing an automatic braking apparatus, said automatic braking apparatus including a driver weight sensor associated with a vehicle driver seat, a vehicle velocity sensor, an emergency brake actuator, an engine kill switch, a vehicle horn activation switch for activating a vehicle horn, and a microprocessor, said microprocessor interfaced with said driver weight sensor, said vehicle velocity sensor, said emergency brake actuator, said engine kill switch, and said vehicle horn activation switch;

(b) entering and storing a weight load window for said driver weight sensor and a vehicle velocity threshold for said vehicle velocity sensor;

(c) monitoring said driver weight sensor and said vehicle velocity sensor;

(d) activating said emergency brake actuator when weight sensed by said driver weight sensor is outside said weight load window concurrently with velocity sensed by said vehicle velocity sensor being below said vehicle velocity threshold; and (e) activating said engine kill switch when weight sensed by said driver weight sensor is outside said weight load window concurrently with velocity sensed by said vehicle velocity sensor being below said vehicle velocity threshold.

18. A method for arresting movement of a vehicle as recited in claim 17, further comprising the step of activating said vehicle horn when weight sensed by said driver weight sensor is outside said weight load window concurrently with velocity sensed by said vehicle velocity sensor being below said vehicle velocity threshold.

* * * * *